United States Patent [19]
Meaney et al.

[11] Patent Number: 5,862,360
[45] Date of Patent: Jan. 19, 1999

[54] SYSTEM RESOURCE ENABLE APPARATUS WITH WAKE-UP FEATURE

[75] Inventors: Patrick J. Meaney; Adrian E. Seigler, both of Poughkeepsie, N.Y.

[73] Assignee: International Business Machines Corporation, Armonk, N.Y.

[21] Appl. No.: 465,964

[22] Filed: Jun. 6, 1995

Related U.S. Application Data

[63] Continuation-in-part of Ser. No. 414,856, Mar. 31, 1995, Pat. No. 5,710,933.

[51] Int. Cl.[6] .................................................. G06F 12/00
[52] U.S. Cl. ............................................ 395/478; 395/427
[58] Field of Search ..................................... 395/800, 478, 395/427; 365/229

[56] References Cited

U.S. PATENT DOCUMENTS

| | | | |
|---|---|---|---|
| 4,590,586 | 5/1986 | Zenk | 395/478 |
| 5,337,285 | 8/1994 | Ware | 365/227 |
| 5,422,855 | 6/1995 | Eslick | 365/229 |
| 5,469,386 | 11/1995 | Obara | 365/189.07 |

*Primary Examiner*—Eric Coleman
*Attorney, Agent, or Firm*—Lynn Augspurger, Esq.; Morgan & Finnegan, LLP

[57] ABSTRACT

A system resource enable apparatus for enabling operations on a system resource including a register representing current and future operations on the resource, a pattern generator that applies a pattern corresponding to a requested resource operation to each of a plurality of requests for resource operations in a queue, compare logic that determines for each of the plurality of requests if the request will conflict with other resource operations by comparing the pattern applied to the request with the register, priority grant logic that grants priority to a request in the queue if no conflict is determined and to update the register according to the pattern applied to the request, and resource enable logic that enables operations on the resource according to the register. An automatic wake-up mechanism may also be provided to keep the array active during extended periods of non-use.

7 Claims, 8 Drawing Sheets

| REQUEST TYPE | | PATTERN USED FOR CONFLICT CHECKING | |
| --- | --- | --- | --- |
| OPERATION | STARTING INTERLEAVE | ILV0 | ILV1 |
| LINE FETCH | 0 | 101010100 | 010101010 |
| LINE FETCH | 1 | 010101010 | 101010100 |
| LINE STORE | 0 | 001010101 | 000101010 |
| LINE STORE | 1 | 000101010 | 001010101 |
| QW STORE | 0 | 001000000 | N/A |
| QW STORE | 1 | N/A | 001000000 |

FIG. 5

| | C2 | C3 | C4 | C5 | C6 | C7 | C8 | C9 |
| --- | --- | --- | --- | --- | --- | --- | --- | --- |
| ILV0 | 1 | | 1 | | 1 | | 1 | |
| ILV1 | | 1 | | 1 | | 1 | | 1 |

| | C2 | C3 | C4 | C5 | C6 | C7 | C8 | C9 |
| --- | --- | --- | --- | --- | --- | --- | --- | --- |
| ILV0 | | | 1 | | | | | |
| ILV1 | | | | | | | | |

SYSTEM RESOURCE ENABLE APPARATUS WITH WAKE-UP FEATURE

CROSS-REFERENCE TO RELATED APPLICATIONS

This patent application is a continuation-in-part of U.S. patent application Ser. No. 08/414,856 entitled SYSTEM RESOURCE ENABLE APPARATUS which was filed on Mar. 31, 1995, now U.S. Pat. No. 5,710,933 in the names of Patrick J. Meaney and Adrian E. Seigler.

BACKGROUND OF THE INVENTION

The present invention relates to controls for system resources and, more particularly, to controls for shared system resources providing for power conservation.

In semiconductor chips with large cache arrays, a substantial amount of the available power is used by the array. In one attempt to reduce array power consumption, lower-power array cells have been utilized. Such low-power array cells, however, may degrade system performance.

In another attempt to reduce array power consumption, arrays have been designed which allow the clock input to be shut off providing an array "standby" mode. These arrays, however, often suffer performance degradation resulting from turning on the array in the cycle that it is needed.

In the prior art is U.S. Pat. No. 5,339,445 to Gasztonyi which describes a further attempt to reduce array power consumption. Gasztonyi maintains a data table with historical information on power consumption and uses the data to regulate power for future operations. Operating on historical data, however, can lead to inaccuracies in power application and correspondingly to inefficient operation of the array.

Thus, there is a need in the art for a method and apparatus for controlling power application to an array that conserves power while optimizing array performance.

SUMMARY OF THE INVENTION

With the foregoing in mind, it is an object of the invention to provide a method and apparatus for controlling energization of an array so as to optimize system performance.

In accordance with the invention, an array enable line is provided to the array which provides the ability to disable the system clock. If the array enable is low, the clock signal is not provided to the array, leaving the array in standby mode, and array power consumption is reduced.

The array remains in standby mode during non-use cycles. Using array enable logic, the array is switched on at least one cycle before the array is to be used. Thus, performance degradation is minimized because the array is energized prior to array operations being performed.

Thus, the invention provides lower array power consumption without performance degradation typically found in prior power reduction techniques. Additionally, since the array enable logic operates based upon available resource information, the array enable logic may be adapted to accommodate different power modes of operation.

An automatic wake-up mechanism may also be provided to keep the array active during extended periods of non-use.

BRIEF DESCRIPTION OF THE DRAWINGS

The accompanying drawings, referred to herein and constituting a part hereof, illustrate preferred embodiments of the invention and, together with the description, serve to explain the principles of the invention, wherein:

FIG. 8 illustrates a state machine of some controlling logic which can be used to force the array enable line on;

DETAILED DESCRIPTION OF THE DRAWINGS

As described hereinafter, the resource enable apparatus according to the invention is applied to a random access memory array. It will be appreciated that the enable apparatus is equally applicable to other system resources including dedicated logic.

Figure 1:
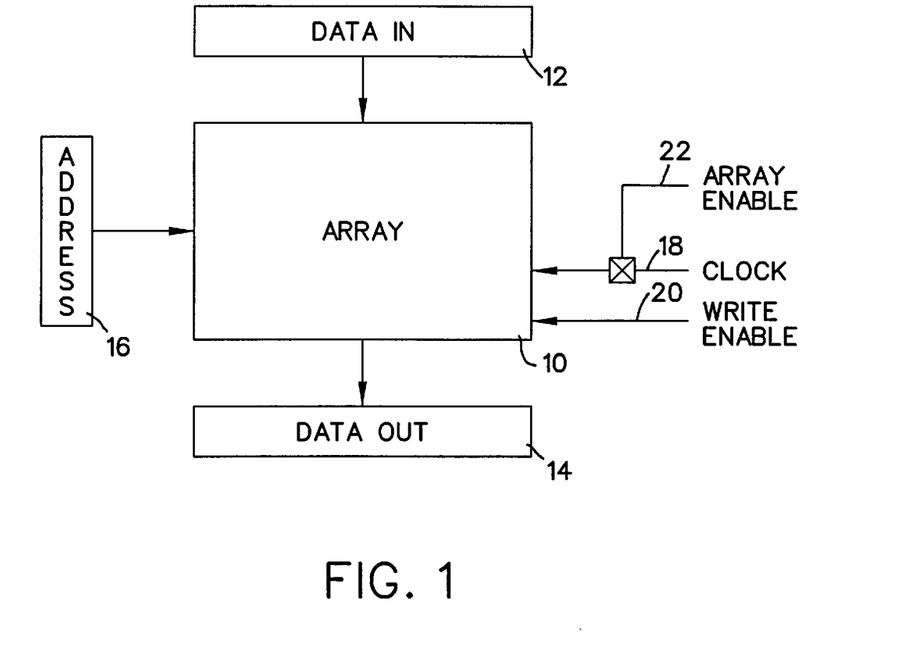
FIG. 1 illustrates an array provided with an array enable line in accordance with the invention.

FIG. 1 illustrates a random access memory (RAM) array 10 with an input register 12 for incoming data and an output register 14 for outgoing data. For purposes of the discussion herein, the array may be considered as a two-dimensional array, the width of the array being the same as an incoming data word. An address register 16 is provided for selecting word lines in the array. Clock and write enable lines 18, 20, respectively, are also provided. In accordance with the invention, an array enable line 22 which enables/disables clock line 18 is also provided. It will be appreciated that the array described may actually comprise multiple arrays.

Figure 2:
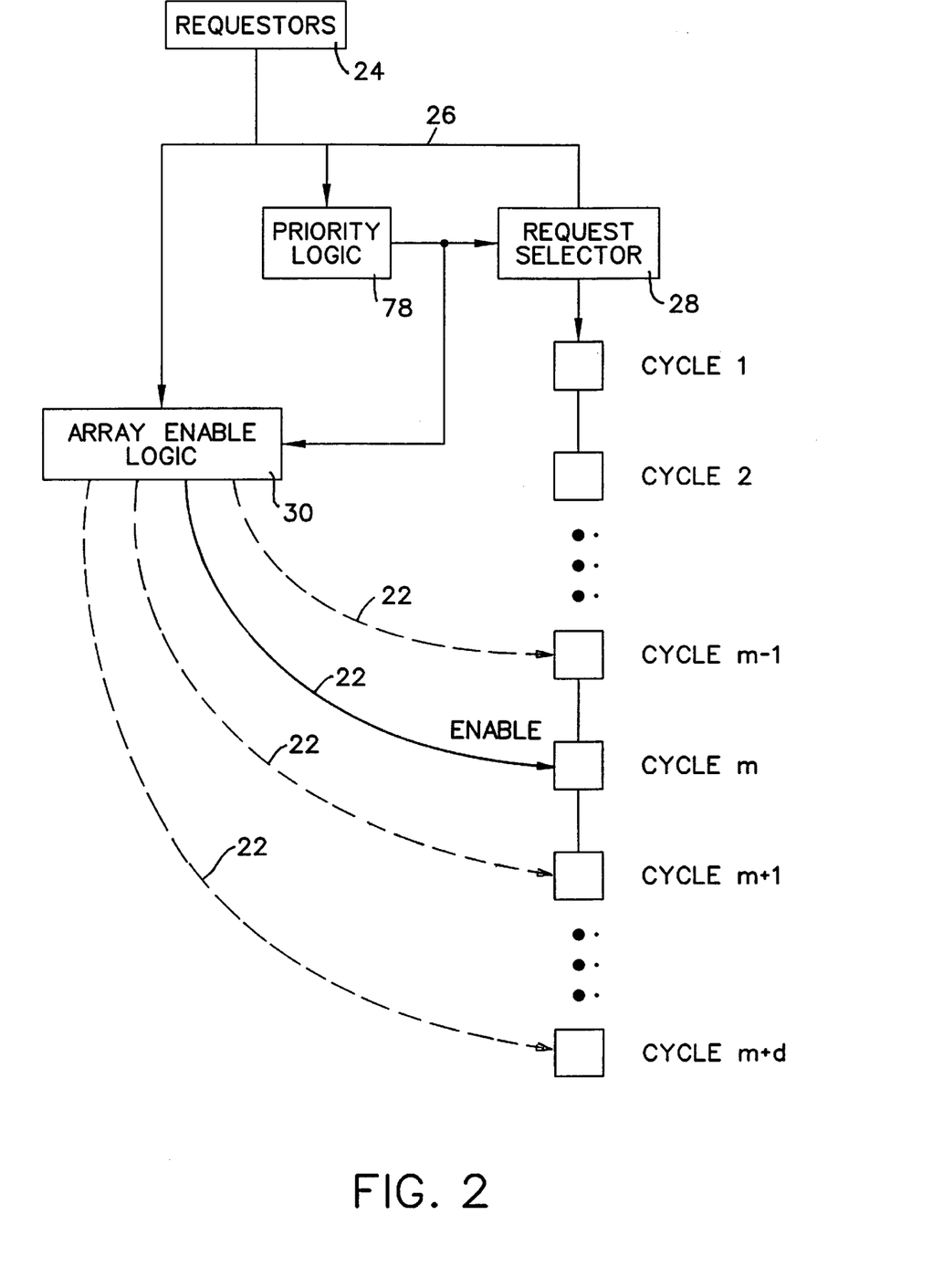
FIG. 2 shows an example of a pipelined request queue.

FIG. 2 illustrates a pipeline (serialized) request queue wherein a number "n" of requesters 24 present requests on request bus 26 and one request is selected and permitted access to the pipeline in accordance with priority logic 78 and request selector 28. It may be appreciated that any number of requesters may be vying for priority to gain access to the pipeline at a given time and it is priority logic 78 and request selector 28 that decide which one of requestors 24 will be granted access.

Array enable logic 30 is also provided, in parallel with priority logic 78 and request selector 28, which, in addition to looking at the identity of the requestor, makes a determination about whether or not that requestor will need to use array 10 and, if so, for how many cycles. Thus, at the same time that a decision is being made as to whether a requestor will gain access to pipeline, information is also being compiled about if, when, and for how long that requestor will need to use array 10 in order to turn the array enable line 22 on and off. Priority may be given to a particular requestor, but since the array is to be used starting at cycle m for a duration of d+1 cycles, then the array enable line is turned on at least one cycle prior to cycle m.

As preferably embodied, array 10 is in standby mode when array enable line 22 is not active. By turning on the array enable line at the optimal time, performance losses are minimized by precharging of the array. It will be appreciated that this arrangement provides the ability to adapt to any duration or starting point according to system requirements. Preferably, the array enable line is turned on one cycle prior to the array being needed.

As shown by the dotted line in FIG. 2, array enable line 22 is turned on in the m−1 cycle so that the array will be ready for use by the requestor in cycle m as illustrated by the solid line. The array enable line will then stay turned on for d cycles after the m cycle for a total of d+1 cycles, or until cycle m+d.

It may be appreciated that without array enable logic 30, if a requestor started to use the array from the cycle that the array was needed, a certain amount of time would be taken off the operation even though the array may still adequately function. That first cycle would be slower and system performance would be degraded by such slower array operation.

Figure 3:
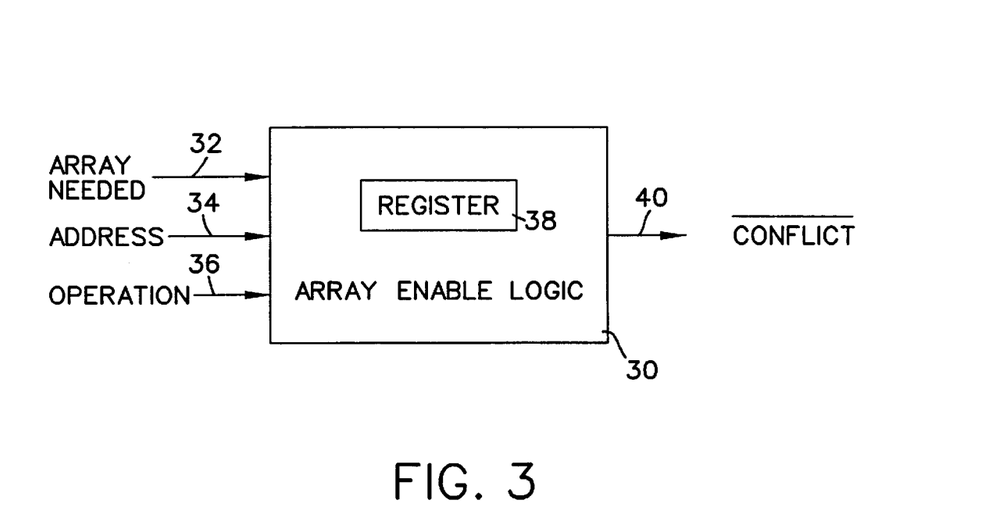
FIG. 3 illustrates a request being presented to the array enable logic.

As shown in FIG. 3, the input to array enable logic 30 for a particular requester includes array needed line 32, address line 34, and operation line 36. As will be seen below, one address bit for address line 34 may be all that is required. At the start of priority selection, array enable logic 30 sees the input lines and recognizes that the requestor needs the array, e.g., for a line fetch operation. Using a register 38 that represents the operational status of the array for current and future cycles, array enable logic 30 then makes a determination as to whether there is a contention downstream, i.e., at the time that the requested array operation is to be done there will be a conflict with other anticipated array operations. This is to prevent, for example, a prior requestor attempting use the same array at the same time as the current requestor, in which case results would be unpredictable and control would be lost.

The array enable logic provides a "no conflict" line 40. If the no conflict line is "1", then the request presents no problem; if the no conflict line is "0", then the request for priority will continue until such time as the no conflict line is "1".

Figure 4A:
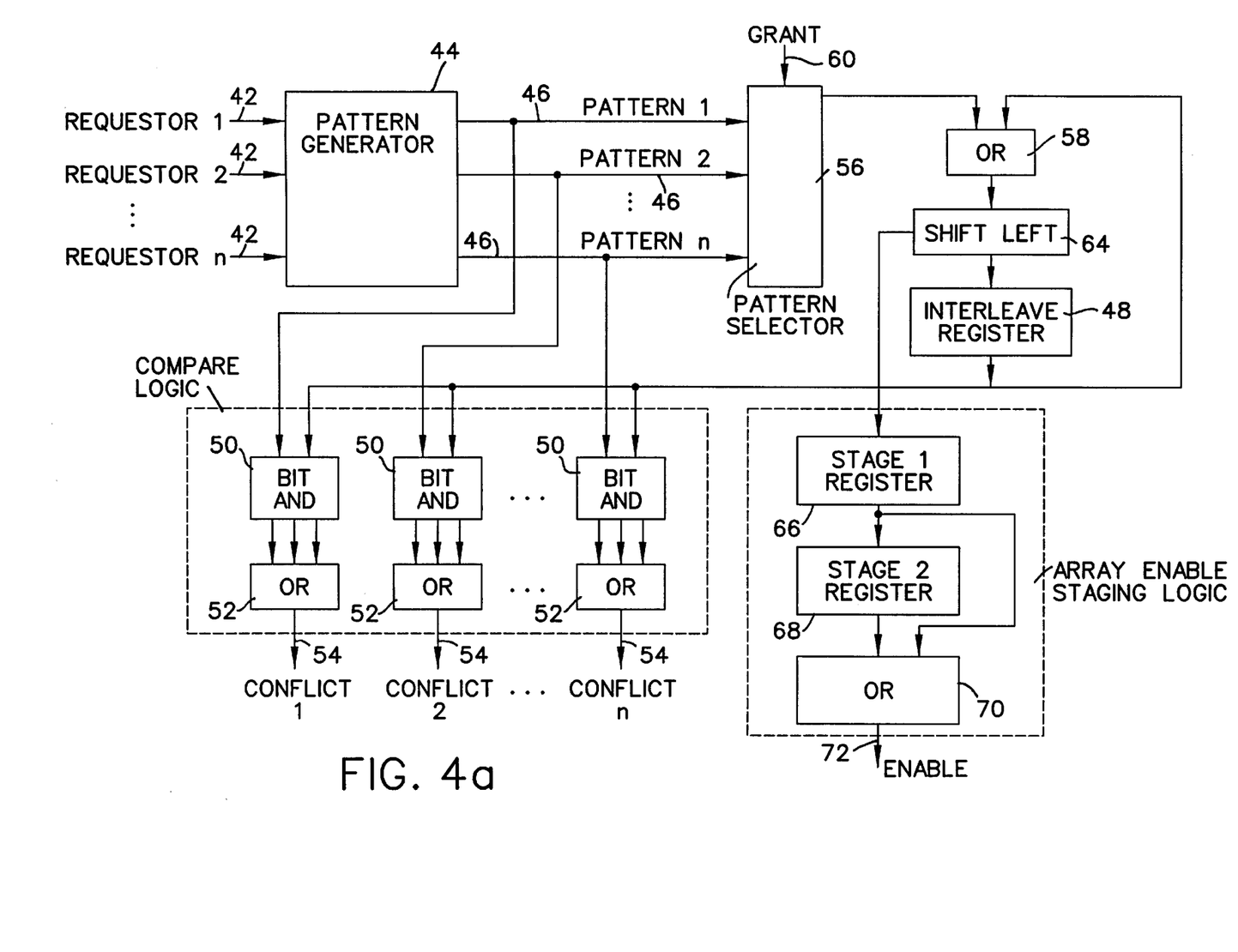
FIGS. 4a and 4b illustrate a preferred implementation of the array enable logic in accordance with the invention.
Figure 4B:
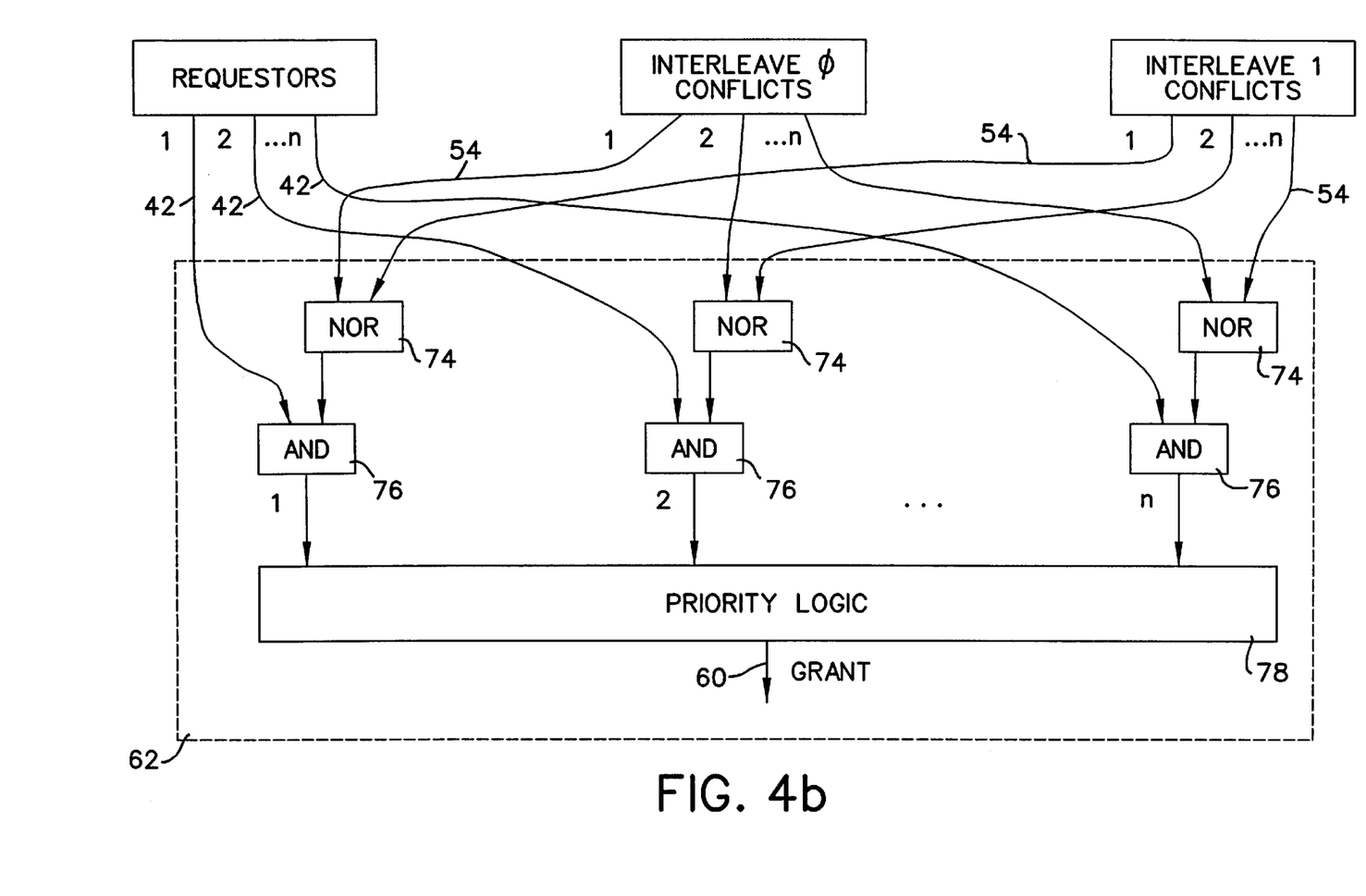

FIGS. 4a and 4b illustrate a preferred implementation of the array enable logic in accordance with the invention. In FIG. 4a, a single interleave implementation is shown with requests from a number "n" requesters coming in on request buses 42 to pattern generator 44, which generates a pattern corresponding to each request, for output on pattern buses 46. Details of the pattern generator are discussed in more detail below. The output of interleave register 48 and pattern buses 46 are connected through Bit-AND's 50 and, where any bit in interleave register 48 is zero, the corresponding output of Bit-AND 50 will be zero.

As an example, if four bits in interleave register 48 corresponding to cycles where the generated pattern indicates that interleave access will be required are zeros, then all of the output bits of Bit-AND 50 will be zeros. Similarly, if any of the four bits corresponding to cycles where the generated pattern indicates that interleave access will be required are ones, then at least one of the output bits of Bit-AND 50 will be a one representing a conflict. The outputs of each of the Bit-AND's 50 connected through OR's 52 providing an indication on conflict lines 54 of whether a conflict exists for that requestor against the interleave.

Pattern selector 56 selects one of the patterns on pattern lines 46 and outputs the pattern to OR 58. The grant bus 60 input to pattern selector 56 is from priority selection logic 62 which is described in more detail below.

The pattern from pattern selector 56 and the output of the interleave register 48 are connected through Bit-OR 58 and shift left 64. Thus, the output of Bit-OR 58 represents the status of the interleave on the current cycle, and the output of shift left 64 represents the status of the interleave one cycle in the future.

The output of the shift left 64, i.e., the overflow, represents the status of the interleave two cycles before the array is to be used and is stored in stage one register 66. The output of stage one register 66 represents one cycle before the array is to be used.

Stage two register 68 represents one cycle later than the stage one register, due to the extra cycle of staging, and thereby represents the current cycle. The outputs of stage one register 66 and stage two register 68 are connected through OR 70 allowing the array to be turned on one cycle early and be maintained through the current cycle via array enable line 72. The array will turn off the cycle after there are no more array operations.

As shown in FIG. 4b, the priority selection logic 62 has as inputs the same requests from a number "n" requestors coming in on request buses 42 as in FIG. 4a. As illustrated in the figure, however, there are now two interleaves; interleave 0 and interleave 1, and the logic for each interleave is implemented as shown in FIG. 4a above.

Also input to priority selection logic 62 are conflict buses 54 for each of interleave 0 and interleave 1. The conflict buses for interleave 0 and interleave 1 are connected through NOR's 74, the output of which are then connected through AND's 76 along with request buses 42. The output of each NOR 74 provides that if either interleave has a conflict, then the output of the NOR is zero and the request is ultimately barred from getting priority. output of AND's 76 will be a one only if there is a request for which both interleave inputs were zero, representing a request with no conflict. The outputs of the AND's 76 are then used to determine which request is selected by priority logic 78, e.g., round robin priority logic. The output of the priority logic goes to grant bus 60 for use in the interleave conflict determination.

Figure 5:
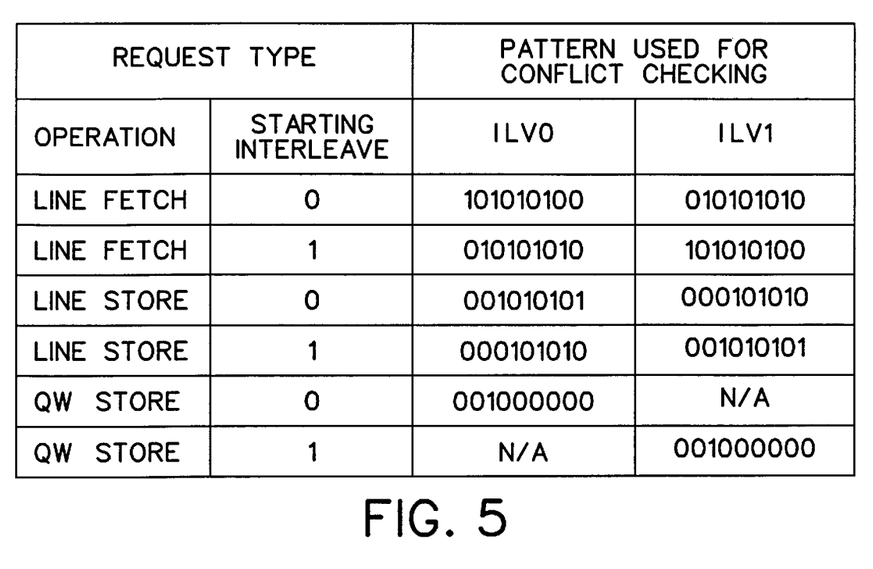
FIG. 5 illustrates pattern masks for various operational requests.

A table of patterns provided by the pattern generator 44 is used to determine if an interleave conflict exists as shown in FIG. 5. For a given request type, if the interleave register in the array enable logic is zero for all one's in the table, then no interleave conflict exists for the request.

Figure 6:
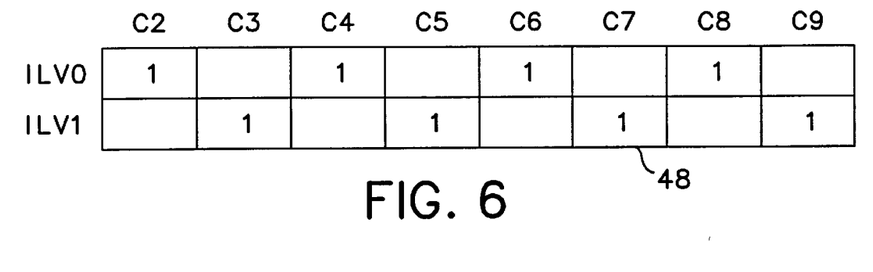
FIG. 6 illustrates an interleave register configuration for a line fetch operation.
Figure 7:
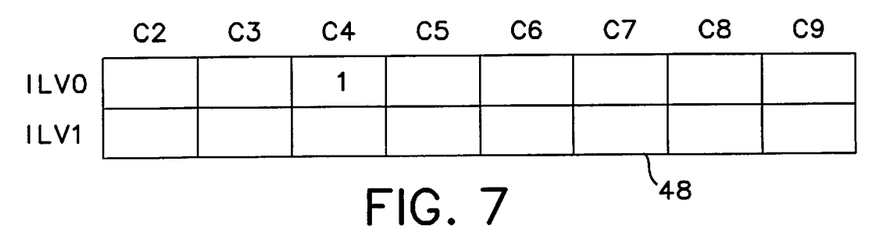
FIG. 7 illustrates an interleave register configuration for a double word store operation.

As described above, within array enable logic 30 is a set of interleave registers 48 as shown in FIGS. 6 and 7. Interleave registers 48 represent future state of the array (cycles C2–C9) and thereby provide a mask against which a compare can be made for a requester desiring a particular resource at some future time. The contents of interleave register 48 are compared to a pattern representing the particular operation that the requestor is desiring to determine if a conflict exists.

FIG. 6 illustrates a line fetch operation wherein ILV0 and ILV1 indicate interleave addresses. Either interleave 0 (ILV0) or interleave 1 (ILV1) is selected via the address line. Alignment is such that, if broken down into quad words (16 bytes), a line is eight quad words. Interleaves are arranged on a quad word address basis so there are eight quad words. In cycle 0 (the current cycle), a request for priority is made. The array enable logic knows that all line fetches start on cycle C2 once the request has gained priority and, because there are eight quad words in the line, the line fetch will take eight cycles to complete. Thus, when a request for a line fetch operation from interleave 0 is made in cycle 0, the ILV0 interleave register is compared to the prestored pattern for a line fetch operation and a busy condition is indicated in cycles C2, C4, C6, and C8.

Thus, as illustrated in FIG. 6, at cycle C0 the request comes in and the array will start to get busy in cycle C2 and will be busy for eight cycles. Thus, in cycle C2 a "1" indicates that logically the array is busy. It may be appreciated that in reality what happens is that there are actually two interleaves which together comprise the logical array. In the first cycle of the line fetch operation, cycle C2, the first quad word will be fetched from the first interleave ILV0 and in the next cycle, cycle C3, the second quad word in the line will be fetched from the second interleave ILV1. Thus, there are two physical arrays, one for each interleave.

With each passing cycle, the interleave registers in the array enable logic get updated. Clock cycles continue to pass and eventually the line fetch operation is completed. In FIG. 6, this is represented by shifting the 1's in the interleave register to the left every cycle so that eventually, after eight cycles, all of the 1's have been shifted out of the interleave register.

FIG. 7 similarly illustrates a double word store operation. The array standby logic knows that for a single double word store operation the only busy cycle is cycle C4. If the double word store request gets priority in the pipeline, the requestor will need to use the array on cycle C4 and will only need one cycle to complete the operation.

Thus, if the interleave register maintained within the array enable logic was as shown in FIG. 7 at the time that a double word store operation on interleave ILV0 was requested, the array enable logic would recognize that interleave ILV0 would be needed on cycle C4 but that there exists a conflict with an anticipated operation. Therefore, the no conflict line is "0" and the requester is not granted priority into the pipeline. On the other hand, if the requestor wanted to use interleave ILV1, no conflict would exist because there is no anticipated operation on interleave ILV1 in cycle C4.

It may be appreciated that line fetch and double word store operations could be done simultaneously because they are not operating on the same physical array. Logically, however, it may appear that they are both reading and writing at the same time. For example, if the double word store in FIG. 7 started one cycle after the line fetch in FIG. 6, then the C4 write to interleave ILV0 would line up with the C5 read from interleave ILV1. Therefore, no conflict would exist between the store to interleave ILV0 and the fetch from interleave ILV1.

Advantageously, the array enable logic according to the invention allows handling of almost any predetermined combination of conflicts that could occur in the future by simply changing the pattern generation logic. All that need be done is to generate a pattern corresponding to the future event for the interleave register to check against.

The array enable logic according the invention may also be adapted to handle possible rejects. Instead of having a single ILV0 interleave register, there would be more than one. One register may be provided per requestor, with corresponding OR's and shift left's as in FIG. 4a, then all registers could be ORed together to provide a bus that is used for the compare logic. The shift left overflows could be ORed to provide a staging signal. If there was a reject of a particular requester at any point in time, its corresponding interleave register could be zeroed out freeing up all the possible interleaves that were blocked.

The array standby logic also need not work off the shift left bit that overflows as the logic may also work off an intermediate bit somewhere in the interleave register to predict not only one cycle in the future but possibly two or more depending on how much the logic is intended to lead the current cycle. Further, the array enable logic could be extended beyond two stages if it is desired to have the array stay on for additional cycles.

It is also possible to provide an automatic wake-up mechanism to keep the array active during extended periods of non-use. This may be accomplished by periodically enabling the array even if not used.

Figure 8:
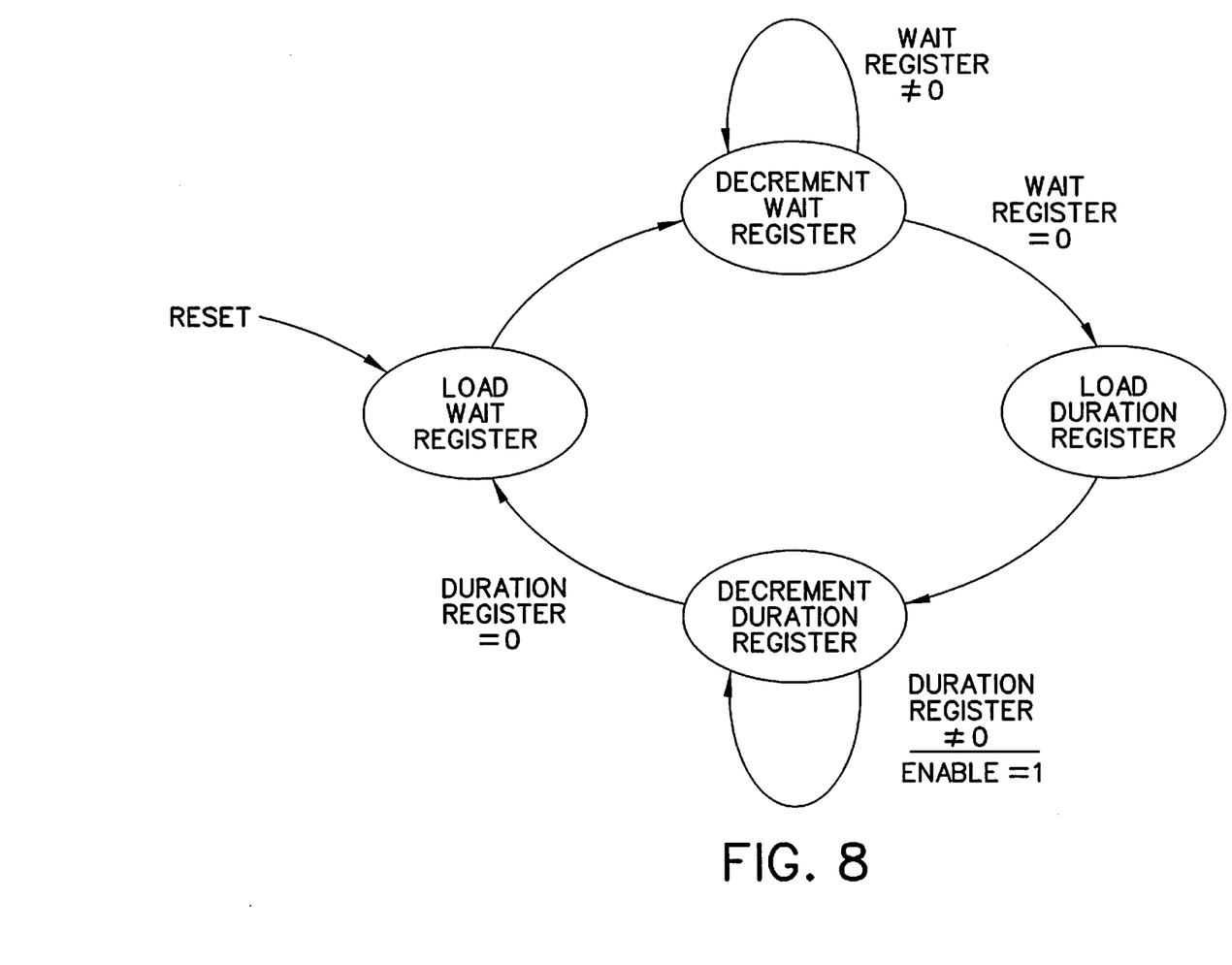

FIG. 8 illustrates a state machine of some controlling logic which can be used to force the enable on after a maximum period ("wait") for a minimum number of cycles ("duration").

Figure 9:
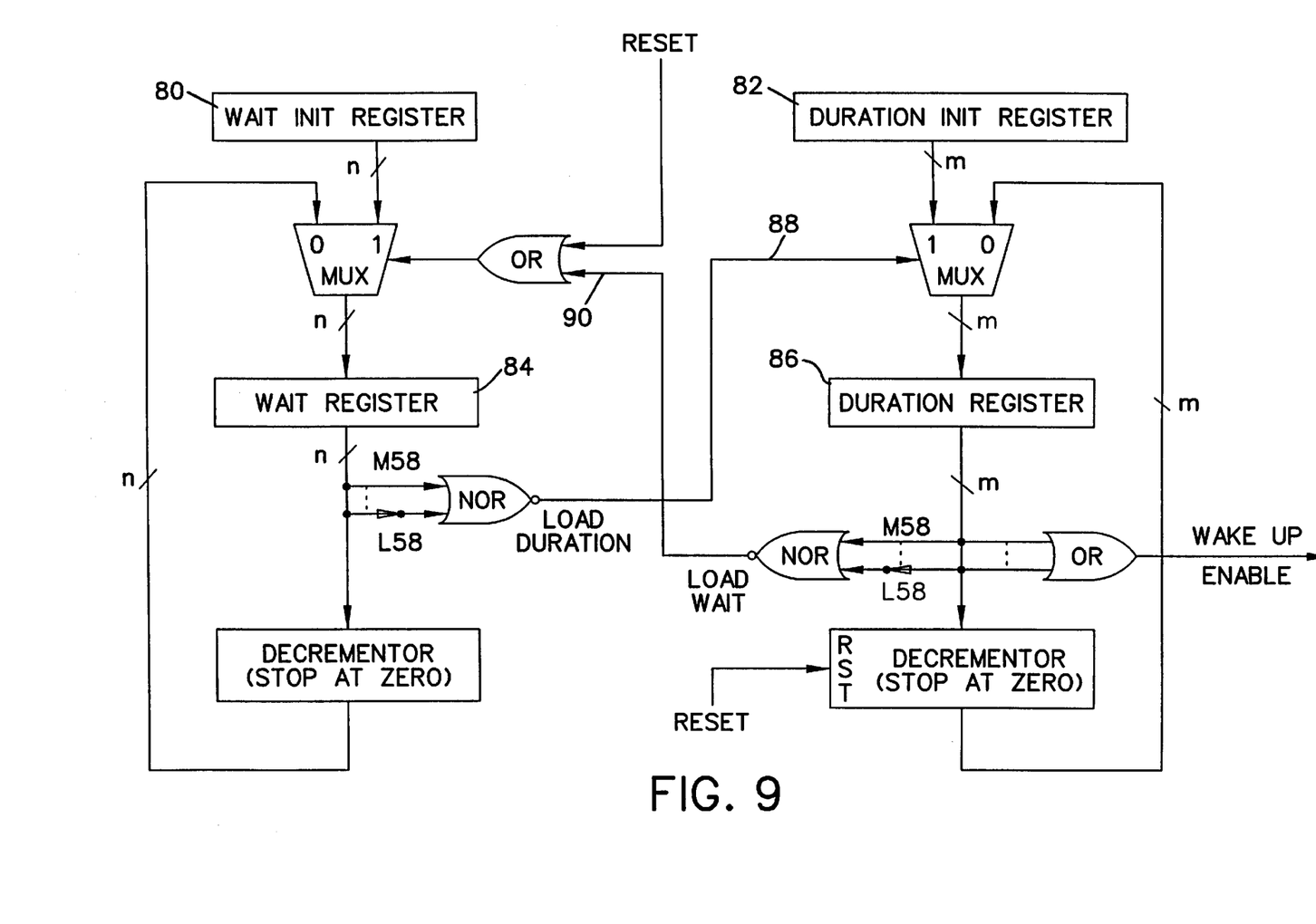
FIG. 9 illustrates a hardware implementation of a programmable wake up controller.

FIG. 9 shows a hardware implementation of a programmable wake up controller. The wait init register 80 is initialized to the recommended number of cycles the array can be inactive. The duration init register 82 is initialized to the recommended number of cycles the array should be active following the wait period.

For example, there may exist a power-supply requirement that the array or other system resource must be on for an average of at least 10% of the time and there cannot be a period of more than 100 cycles of non-use. It would therefore be necessary to enable the array even if not used. The following settings would all be valid:

| Wait | Duration | Period | Percent |
|------|----------|--------|---------|
| 9    | 1        | 10     | 10      |
| 18   | 2        | 20     | 10      |
| 27   | 3        | 30     | 10      |
| 36   | 4        | 40     | 10      |
| 45   | 5        | 50     | 10      |
| 54   | 6        | 60     | 10      |
| 63   | 7        | 70     | 10      |
| 72   | 8        | 80     | 10      |
| 81   | 9        | 90     | 10      |
| 90   | 10       | 100    | 10      |
| 99   | 11       | 110    | 10      |

Referring to FIG. 9, the reset signal is held active for a few cycles to force the system into the initial state. The wait register 84 is loaded with the value from the wait init register 80. The duration register 86 is forced to zero, thereby causing the output enable signal to zero.

While the wait register 84 is non-zero, it will continue to decrement-by-one each cycle. When the wait register reaches a value of '1', the load duration signal 88 will become active, thereby loading the duration register 86 with the value from the duration init register 82. After the next clock pulse, the wait register 84 will reach zero and the duration register 86 will contain the starting duration count.

While the duration register 86 is non-zero, it will continue to decrement-by-one each cycle. When the duration register reaches a value of '1', the load wait signal 90 will become active, thereby loading the wait register with the value from the wait init register 80. After the next clock pulse, the duration register 86 will reach zero and the wait register will contain the starting wait count. The process continues as before.

Figure 10:
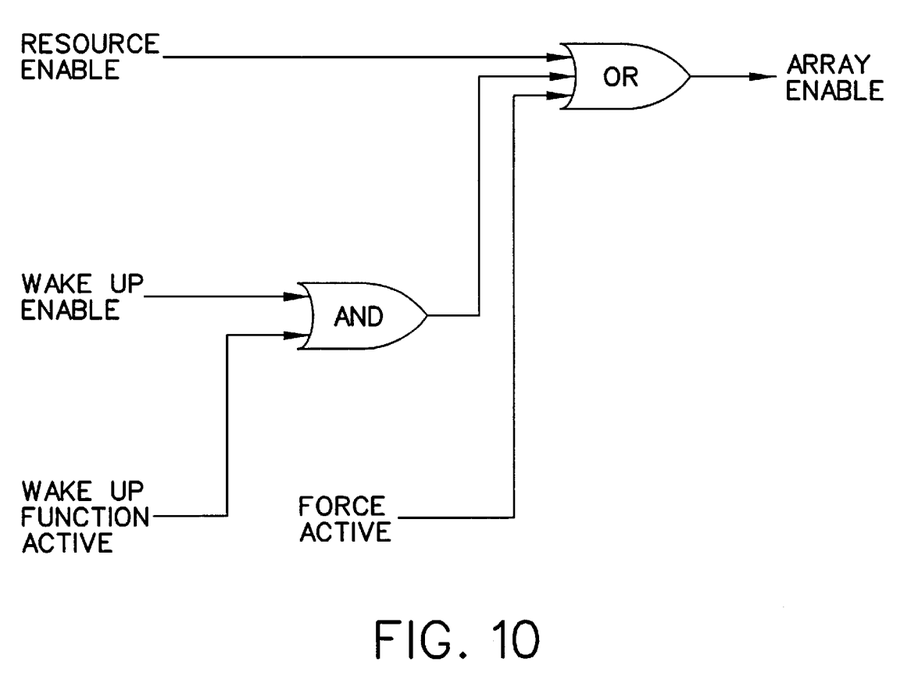
FIG. 10 illustrates derivation of the final array enable signal from the resource enable and wake up enable signals.

FIG. 10 illustrates derivation of the array enable signal from the resource enable and wake up enable signals. Two additional signals are shown. Wake up function active is a signal or latch indicating whether the wake up logic should be turned on. If off, the wake up enable signal will not affect the array enable signal. The force active signal or register is used to force the array enable line active regardless of whether any of the resource or wake up enable lines are active. This can be used to disable the use of the invention.

While the invention has been described in its preferred embodiments, it is to be understood that the words which have been used are words of description, rather than limitation, and that changes may be made within the purview of the appended claims without departing from the true scope and spirit of the invention in its broader aspects. For example, although described in terms of clock cycles, the invention could also be implemented in a continuous non-clocked pipeline.

What is claimed:

1. A system resource enable apparatus, comprising:
   (a) a register representing current and future operations on the resource;
   (b) a pattern generator that applies a pattern corresponding to a requested resource operation to each of a plurality of requests for resource operations in a queue;
   (c) compare logic that determines for each of said plurality of requests if the request will conflict with other resource operations by comparing the pattern applied to the request with said register;
   (d) priority logic that grants priority to a request in the queue if no conflict is determined and to update said register according to the pattern applied to the request; and
   (e) resource enable logic that enables operations on the resource according to said register;
   wherein said resource enable logic further comprises:
      (a) means for waiting a specified wait time interval during which the resource is inactive; and
      (b) means for enabling the system resource for a specified time interval upon expiration of the wait time interval.

2. A system resource enable apparatus in accordance with claim 1, wherein said means for waiting includes a wait register and a decrementor.

3. A system resource enable apparatus in accordance with claim 2, further comprising means for initializing said wait register.

4. A system resource enable apparatus in accordance with claim 1, wherein said means for enabling includes a duration register and a decrementor.

5. A system resource enable apparatus in accordance with claim 4, further comprising means for initializing said duration register.

6. A system resource enable apparatus in accordance with claim 1, further comprising means for enabling and disabling the system resource enable apparatus.

7. A system resource enable apparatus in accordance with claim 1, further comprising means for bypassing the system resource enable apparatus and enabling the system resource.

* * * * *